United States Patent
Vonk et al.

(10) Patent No.: US 12,227,668 B2
(45) Date of Patent: Feb. 18, 2025

(54) USE OF PREFORMED REACTION PRODUCTS OF CATECHOL COMPOUNDS AND FUNCTIONALIZED CO-REACTANT COMPOUNDS TO REDUCE OXIDATION OF BARE METAL SURFACES

(71) Applicant: Henkel AG & Co. KGaA, Duesseldorf (DE)

(72) Inventors: Donald Robb Vonk, Clinton Township, MI (US); Louis Patrick Rector, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/437,072

(22) Filed: Jun. 11, 2019

(65) Prior Publication Data

US 2019/0292665 A1    Sep. 26, 2019

Related U.S. Application Data

(63) Continuation of application No. PCT/US2017/068134, filed on Dec. 22, 2017.

(60) Provisional application No. 62/437,696, filed on Dec. 22, 2016.

(51) Int. Cl.
| | |
|---|---|
| C09D 179/02 | (2006.01) |
| B32B 15/04 | (2006.01) |
| B32B 15/08 | (2006.01) |
| C23C 22/05 | (2006.01) |
| C23C 22/06 | (2006.01) |
| C23C 22/07 | (2006.01) |
| C23C 22/50 | (2006.01) |
| C23C 22/56 | (2006.01) |
| C23C 22/60 | (2006.01) |
| C23C 22/73 | (2006.01) |
| C23C 22/76 | (2006.01) |
| C23C 22/82 | (2006.01) |
| C23F 11/04 | (2006.01) |

(52) U.S. Cl.
CPC .......... *C09D 179/02* (2013.01); *B32B 15/04* (2013.01); *B32B 15/08* (2013.01); *C23C 22/05* (2013.01); *C23C 22/06* (2013.01); *C23C 22/07* (2013.01); *C23C 22/50* (2013.01); *C23C 22/56* (2013.01); *C23C 22/60* (2013.01); *C23C 22/73* (2013.01); *C23C 22/76* (2013.01); *C23C 22/82* (2013.01); *C23F 11/04* (2013.01)

(58) Field of Classification Search
CPC ....... C09D 179/02; B32B 15/04; B32B 15/08; C23C 22/05; C23C 22/06; C23C 22/50; C23C 22/56; C23C 22/60; C23C 22/73; C23C 22/76; C23C 22/82
See application file for complete search history.

(56) References Cited

U.S. PATENT DOCUMENTS

| | | | |
|---|---|---|---|
| 5,015,507 A | 5/1991 | DesLauriers et al. | |
| 5,266,410 A | 11/1993 | Lindert et al. | |
| 5,891,952 A | 4/1999 | McCormick et al. | |
| 6,027,578 A | 2/2000 | Marzano | |
| 6,132,808 A * | 10/2000 | Brown | C09D 4/00 427/387 |
| 6,607,610 B1 * | 8/2003 | Carey | C08G 14/06 106/14.12 |
| 7,063,735 B2 | 6/2006 | Fristad et al. | |
| 7,390,847 B2 * | 6/2008 | Gonzalez | C09D 179/02 148/251 |
| 7,976,692 B2 | 7/2011 | Hu et al. | |
| 8,287,662 B2 | 10/2012 | Inbe et al. | |
| 8,999,452 B2 * | 4/2015 | Messersmith | C09D 5/1681 427/402 |
| 9,028,667 B2 * | 5/2015 | Inbe | C09D 183/08 148/247 |
| 9,394,621 B2 | 7/2016 | Inbe et al. | |
| 2004/0079647 A1 | 4/2004 | Warburton et al. | |
| 2004/0137246 A1 | 7/2004 | Fristad et al. | |
| 2005/0121114 A1 | 6/2005 | Fernandez et al. | |
| 2005/0126427 A1 * | 6/2005 | Gonzalez | C09D 161/14 427/435 |
| 2006/0172064 A1 | 8/2006 | Kolberg et al. | |
| 2008/0171012 A1 | 7/2008 | Messersmith et al. | |
| 2008/0302448 A1 | 12/2008 | Frey et al. | |

FOREIGN PATENT DOCUMENTS

| | | |
|---|---|---|
| CN | 1052317 A | 6/1991 |
| CN | 101137767 A | 3/2008 |

(Continued)

OTHER PUBLICATIONS

Moulay ("Dopa/Catechol-Tethered Polymers: Bioadhesives and biomimetic adhesive materials" Polymer Reviews, 54:3, 436-513. Published May 5, 2014.). (Year: 2014).*

Faure et al. ("Catechols as versatile platforms in polymer chemistry." Progress in polymer science 38.1 (2013): 236-270.) (Year: 2013).*

(Continued)

*Primary Examiner* — Ricardo D Morales
(74) *Attorney, Agent, or Firm* — Mary K. Cameron

(57) ABSTRACT

The tendency of a bare metal surface to oxidize (e.g., flash-rust) may be alleviated by contacting the bare metal surface with an aqueous mixture of at least one preformed reaction product obtained by reaction of at least one catechol compound, such as dopamine or a salt thereof, with at least one co-reactant compound functionalized with one or more functional groups reactive with the at least one catechol compound, such as (meth)acryl, primary amino, secondary amino, thiol and/or hydroxyl groups, with polyethyleneimine being an example of a suitable co-reactant compound. Such a rinsing procedure does not interfere with subsequent conversion coating of the metal surface.

25 Claims, No Drawings

(56) References Cited

FOREIGN PATENT DOCUMENTS

| | | | |
|---|---|---|---|
| CN | 102634792 A | 8/2012 |
| CN | 102677032 A | 9/2012 |
| CN | 103435829 A | 12/2013 |
| CN | 103435830 A | 12/2013 |
| CN | 103525154 A | 1/2014 |
| CN | 103739867 A | 4/2014 |
| CN | 103757619 A | 4/2014 |
| CN | 102787312 B | 5/2014 |
| CN | 103789759 A | 5/2014 |
| CN | 104141124 A | 11/2014 |
| CN | 104194026 A | 12/2014 |
| CN | 104211979 A | 12/2014 |
| CN | 104357814 A | 2/2015 |
| CN | 104562002 A | 4/2015 |
| CN | 103183989 B | 6/2015 |
| CN | 104746073 A | 7/2015 |
| CN | 104846354 A | 8/2015 |
| CN | 105088212 A | 11/2015 |
| CN | 105111495 A | 12/2015 |
| CN | 103160824 B | 1/2016 |
| DE | 3835400 A1 | 3/1990 |
| GB | 1129196 A | 10/1968 |
| JP | S5394583 A | 8/1978 |
| JP | 40598199 A | 4/1993 |
| JP | 2001172558 A | 6/2001 |
| JP | 2001181860 A | 7/2001 |
| JP | 2005524767 A | 8/2005 |
| JP | 2007297709 A | 11/2007 |
| JP | 2012072440 A | 4/2012 |
| JP | 2014070278 A | 4/2014 |
| JP | 2016513545 A | 5/2016 |
| KR | 20120082156 A | 7/2012 |
| NL | 287499 A | 2/1965 |
| WO | 03008376 A2 | 1/2003 |
| WO | 2007117044 A1 | 10/2007 |
| WO | 2013185131 A1 | 12/2013 |

OTHER PUBLICATIONS

Roberts ("Heats of polymerization. A summary of published values and their relation to structure." J. Res. Natl. Bur. Stand 44 (1950) : 221-232.)) (Year: 1950).*

Odian (. Principles of polymerization. John Wiley & Sons, 2004.) (Year: 2004).*

LibreTexts ("Thermodynamics of Polymerization". (Sep. 7, 2020). Retrieved Apr. 15, 2021)) (Year: 2020).*

Wang et al. ("Mussel inspired modification of polypropylene separators by catechol/polyamine for Li-ion batteries." ACS applied materials & interfaces 6.8 (2014): 5602-5608.) (Year: 2014).*

International Search Report for PCT/US2017/068127 dated Apr. 26, 2018.

International Search Report for PCT/US2017/068134 dated May 17, 2018.

International Search Report for PCT/US2017/068138 dated May 17, 2018.

Wu et al, "Low-cost mussel inspired poly(catechol/polyamine) coating with superior anti-corrosion capability on copper", Journal of Colloid and Interface Science, 463 (2016), pp. 214-221.

Ghelichkhah et al, "L-cysteine/polydopamine nanoparticle-coatings for copper corrosion protection", Corrosion Science, 91 (2015), pp. 129-139.

Zhao et al, "Mussel-Inspired One-Pot Synthesis of a Fluorescent and Water-Soluble Polydopamine-Polyethyleneimine Copolymer", Macromolecular Rapid Communications, 2015, 36, pp. 909-915, DOI: 10.1002/marc.201500021, Copyright Wiley-VCH Verlag GmbH & Co. KGaA, Weinheim.

Jiang, et al, "Surface Characteristics of a Self-Polymerized Dopamine Coating Deposited on Hydrophobic Polymer Films", American Chemical Society Copyright 2011, dx.doi.org/10.1021/la202877k, Langmuir 2011, 27, pp. 14180-14187.

Supplementary EP Search Report for EP 17885001 dated Jul. 10, 2020.

Supplementary EP Search Report for EP 17882552 dated Jul. 10, 2020.

Supplementary EP Search Report for EP 17885384 dated Jul. 10, 2020.

Saad Moulay: "Dopa/Catechol-Tethered Polymers: Bioadhesives and Biomimetic Adhesive Materials", Polymer Reviews, vol. 54, Issue 3, May 5, 2014, pp. 436-513, *p. 495, lines 7-20; figure 72 *. Cited in Supplementary EP Search Report for EP 17882552 dated Jul. 10, 2020.

Roberts, Donald E., "Heats of Polymerization. A Summary of Published Values and Their Relation to Structure", Journal of Research of the National Bureau of Standards, Research Paper RP2703. vol. 44 (1950), 221-232. Year 1950.

* cited by examiner

USE OF PREFORMED REACTION PRODUCTS OF CATECHOL COMPOUNDS AND FUNCTIONALIZED CO-REACTANT COMPOUNDS TO REDUCE OXIDATION OF BARE METAL SURFACES

CROSS-REFERENCE TO RELATED APPLICATION

This application is a continuation of PCT/US2017/068134, filed Dec. 22, 2017, which claims priority to U.S. Provisional Application No. 62/437,696, filed Dec. 22, 2016, the disclosure of which is incorporated herein by reference in its entirety for all purposes.

FIELD OF THE INVENTION

The present invention relates to methods for preventing or inhibiting the oxidation (e.g., flash-rusting) of bare metal surfaces prior to conversion coating.

BACKGROUND OF THE INVENTION

Many consumer and industrial goods are formed from metal substrates and are exposed to the elements. As such, these metal goods are subject to corrosive environments; thus, they are often coated in protective coatings, including corrosion protection coatings and paints. Many such corrosion protective coatings are known as conversion coatings. Conversion coatings are understood in the art to be a type of metal pretreatment formed by contacting a metallic surface with a metal pretreatment composition, i.e., a conversion coating composition, which modifies the metallic surface and forms a conversion coating thereon. While these conversion coatings enhance the corrosion resistance of metal, the further improvement of conversion coatings is an ongoing market requirement for automotive and white goods applications.

A typical process for applying a conversion coating layer onto a metal substrate involves cleaning, rinsing, applying the conversion coating, post-rinsing or sealing, and painting (such as by electrophoretic coating, also known as E-coating). The bare metal surface is highly reactive after protective oils have been removed and the substrate can oxidize or flash-rust in the case of a steel substrate. The formation of flash-rust can be exacerbated during extended dwell times in the rinsing process. It is well known that visible oxidation product (rust) on the metal surface will result in a poor appearance of the E-coated surface, which is defined as a raised area of greater dry-film thickness than the nearby non-oxidized areas. These paint defects are costly to repair or rework and are to be avoided. In addition to such E-coat appearance defects, oxidation (flash-rust) of the substrate typically decreases the paint adhesion and corrosion resistance of the coated article. One current solution to the problem of oxidation during rinsing involves the use of sodium nitrite in the rinse stages. This solution is not applicable to all regions, however, due to environmental restrictions. Accordingly, the development of alternative methods of preventing or reducing the amount of oxidation or flash-rusting exhibited by a bare metal substrate surface would be highly desirable.

SUMMARY OF THE INVENTION

According to one aspect of the present invention ("Aspect 1"), a method is provided which is comprised of, consists essentially of, or consists of the following steps: a step a) comprising, consisting essentially of or consisting of contacting a bare metal substrate surface with an aqueous mixture (sometimes hereinafter referred to as a "rinse solution" or a "pre-rinse solution", which may be in the form of a true solution or a dispersion and which preferably is storage-stable) comprised of, consisting essentially of or consisting of (in addition to water) at least one preformed reaction product of at least one catechol compound and at least one co-reactant compound comprised of one or more functional groups reactive with the at least one catechol compound (sometimes referred to hereinafter as a "preformed catechol compound/co-reactant compound reaction product") to provide a pre-rinsed metal substrate surface, and a step b) comprising, consisting essentially of or consisting of conversion coating the pre-rinsed metal substrate surface to provide a conversion-coated metal substrate.

As used herein, the term "preformed" when referring to the reaction product means that the reaction product has been formed in advance of contacting an aqueous mixture comprised of the reaction product with a bare metal substrate surface, e.g., at least 5, 30 or 60 minutes in advance of such contacting. Such preformed reaction products thus are to be contrasted with reaction products formed in situ by combining catechol compound and co-reactant compound in water in the presence of a bare metal substrate surface whereby the reaction product essentially simultaneously forms and deposits on the bare metal substrate surface. Thus, the present invention may comprise reacting at least one catechol compound and at least one co-reactant compound comprised of one or more functional groups reactive with the at least one catechol compound to obtain at least one preformed reaction product, storing the at least one preformed reaction product for a period of time (e.g., at least 1 day, or at least 5, 10, 15, 20, 25 or 30 days), using the preformed reaction product after being stored for a period of time to prepare a working bath, and contacting the working bath with a bare metal substrate surface to provide a pre-rinsed metal substrate surface (which thereafter may be conversion coated).

The aforementioned preformed catechol compound/co-reactant compound reaction products passivate the surfaces of metal substrates when used during the rinse stages after cleaning. The preformed reaction products are believed to deposit on the surface of the metal, forming a passivating barrier layer and preventing or inhibiting oxidation/flash-rust formation prior to the deposition of a conversion coating layer. In addition to the capacity to form barrier films, the preformed reaction products may have redox capabilities and as such are capable of acting as reducing agents to prevent or retard oxidation of the metal substrate surface. Without wishing to be bound by theory, the preformed catechol compound/co-reactant compound reaction products may function by reducing ions present on the metal substrate surface and/or by being oxidized preferentially as compared to the metal substrate surface.

The elimination or reduction of flash-rust using the preformed catechol compound/co-reactant compound reaction products in accordance with the present invention is evident even with long dwell times or elevated temperature. Further, rinsing with an aqueous mixture comprising such a preformed reaction product may help to reduce the risk of E-coat appearance defects (E-coat mapping).

It has also been found that the preformed catechol compound/co-reactant compound reaction products, when applied to a bare metal substrate surface, are capable of reducing the zirconium coating weight of a subsequently applied zirconium-based conversion coating system. This characteristic can be utilized to control the deposition of subsequent conversion coating compositions, i.e., to limit the amount of conversion coating deposited during long dwell times in such conversion coating stage (as may occur during line-stoppages, for example).

The preformed catechol compound/co-reactant compound reaction products, when used in rinse stages after cleaning, are also capable of modifying metal substrate surfaces to provide good paint adhesion and corrosion characteristics.

Further aspects of the invention may be summarized as follows:

Aspect 2: The method of Aspect 1, wherein the one or more functional groups reactive with the at least one catechol compound include one or more functional groups selected from the group consisting of (meth)acryl groups, secondary amino groups, primary amino groups, thiol groups and hydroxyl groups.

Aspect 3: The method of Aspect 1 or 2, wherein the at least one catechol compound includes at least one amine-functionalized catechol compound or salt thereof.

Aspect 4: The method of any of Aspects 1-3, wherein the at least one catechol compound includes at least one catechol compound selected from the group consisting of catechol and aminoalkyl-functionalized catechols and salts thereof.

Aspect 5: The method of any of Aspects 1-4, wherein the at least one catechol compound includes at least dopamine or a salt thereof.

Aspect 6: The method of any of Aspects 1-5, wherein the at least one co-reactant compound includes at least one amine compound.

Aspect 7: The method of Aspect 6, wherein the at least one amine compound includes at least one polyamine containing two or more amine groups per molecule which are primary amine groups, secondary amine groups or both primary and secondary amine groups.

Aspect 8: The method of Aspect 6 or 7, wherein the at least one amine compound includes at least one oligomeric or polymeric amine compound comprising a plurality of repeating units having structure —[$CH_2CH_2NH$]—.

Aspect 9: The method of any of Aspects 6-8, wherein the at least one amine compound includes at least one linear or branched polyethyleneimine.

Aspect 10: The method of any of Aspects 1-5, wherein the at least one catechol compound includes at least one amino-functionalized catechol compound or salt thereof and the at least one co-reactant compound includes at least one (meth)acryl-functionalized co-reactant compound.

Aspect 11: The method of any of Aspects 1-10, wherein the at least one preformed reaction product includes at least one preformed reaction product which is polymeric.

Aspect 12: The method of any of Aspects 1-11, wherein the at least one preformed reaction product is obtained by reacting the at least one catechol compound and the at least one co-reactant compound under oxidative conditions.

Aspect 13: The method of any of Aspects 1-12, wherein the at least one preformed reaction product is obtained by reacting the at least one catechol compound with the at least one co-reactant compound in an aqueous reactant mixture at a temperature of from 10 to 100° C. for a time of from 1 to 20 hours in the presence of molecular oxygen (desirably, in the absence of any bare metal substrate surfaces).

Aspect 14: The method of any of Aspects 1-13, wherein the at least one preformed reaction product is present in the aqueous mixture at a concentration of from 5 to 500 ppm.

Aspect 15: The method of any of Aspects 1-14, wherein contacting the bare metal substrate surface with the aqueous mixture is carried out for a time of from 10 seconds to 20 minutes at a temperature of 10 to 54° C.

Aspect 16: The method of any of Aspects 1-15, wherein the aqueous mixture, when contacted with the bare metal substrate surface, has a pH of from 4.5 to 11.

Aspect 17: The method of any of Aspects 1-16, wherein a passivating barrier layer comprised of the at least one preformed reaction product is formed on the bare metal substrate surface during step a).

Aspect 18: The method of any of Aspects 1-17, wherein the bare metal substrate surface is obtained by cleaning a contaminated surface of the metal substrate with an alkaline cleaner.

Aspect 19: The method of any of Aspects 1-18, wherein step b) comprises contacting the pre-rinsed metal substrate surface with an acidic aqueous conversion coating composition comprised of at least one Group IV metal.

Aspect 20: The method of any of Aspects 1-19, wherein the bare metal substrate surface is comprised of iron.

DETAILED DESCRIPTION OF CERTAIN EMBODIMENTS OF THE INVENTION

Preformed Catechol Compound/Co-Reactant Compound Reaction Products

As previously mentioned, an aqueous mixture comprised of (in addition to water) at least one preformed reaction product of at least one catechol compound and at least one co-reactant compound comprised of one or more functional groups reactive with the at least one catechol compound ("preformed catechol compound/co-reactant compound reaction product") is utilized in the method of the present invention. The aqueous mixture may be in the form of a solution or a dispersion, preferably a storage-stable solution or dispersion; as used herein, the term "dispersion" includes mixtures in which none of the components of the mixture are dissolved in an aqueous medium as well as mixtures in which portions of one or more of the components of the mixture are dissolved in an aqueous medium. Generally, the catechol compound(s) and co-reactant compound(s) are selected and reacted to provide one or more organic reaction products in which multiple organic residues or moieties derived from these reactants are covalently bonded to each other. Typically, the reaction product(s) formed is/are polymeric. For example, the preformed reaction product may be a cross-linked polymer. According to advantageous embodiments of the invention, the preformed reaction products are soluble in water. For example, the preformed reaction products may have a solubility in water at 25° C. of at least 0.5%, at least 1%, at least 5% or at least 10% by weight. However, in other embodiments, the preformed reaction products may be dispersible in water, preferably providing storage-stable dispersions.

Catechol Compounds

The term "catechol compound" as used herein means an organic compound with an aromatic ring system that includes at least two hydroxyl groups positioned on adjacent carbon atoms of the aromatic ring system. Suitable catechol compounds include compounds containing at least one 1,2-dihydroxybenzene moiety, i.e., an aromatic ring with hydroxyl groups ortho to each other, wherein the aromatic ring may be substituted (at positions other than where the hydroxyl groups are located) with one or more substituents other than hydrogen. Combinations of two or more different catechol compounds may be used.

According to certain aspects of the invention, one or more catechol compounds in accordance with formula (I) may be utilized:

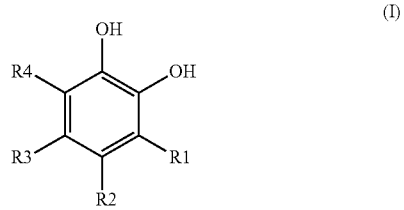

R1, R2, R3 and R4 may be the same as or different from each other and may be hydrogen or any suitable substituent that replaces hydrogen such as, for example, alkyl (e.g., C1-C12 alkyl such as methyl, ethyl, n-propyl, n-butyl and isomers thereof), alkenyl, halo, aminoalkyl, hydroxyalkyl, carboxy, alkoxy, aryl, aroxy, nitro, sulfo and the like and combinations thereof. In certain advantageous embodiments of the invention, the catechol compound contains at least one amine functional group, such as a primary or secondary amine group or a salt thereof (e.g., a hydrohalide salt).

According to certain embodiments, the catechol compound is soluble in water. For example, the catechol compound may have a solubility in water (e.g., pure neutral water) at 25° C. of at least 10 g/L, at least 50 g/L, at least 100 g/L or even higher. In other embodiments, however, the catechol compound may be dispersible in water.

Illustrative, non-limiting examples of suitable catechol compounds include catechol, alkyl-substituted catechols (e.g., 3-methyl catechol, 4-methyl catechol, p-t-butyl catechol, 3-ethyl catechol, 3,5-di-t-butyl catechol, 3-isopropyl catechol, 4-isopropyl catechol, 4-propyl catechol, 3-propyl catechol, 4-pentyl catechol, 4-butyl catechol, 3,4-dimethyl catechol), aminoalkyl-substituted catechols and salts thereof (such as dopamine, 3,4-dihydroxy-L-phenylalanine, epinephrine, norepinedrine, α-methyldopamine, 4-(2-(ethylamino)-1-hydroxyethyl)catechol, N-isopropyl dopamine, 4-(2-aminopropyl)catechol, 3,4-dihydroxybenzylamine, N-methyl dopamine, N,N-dimethyl dopamine, 6-fluoro dopamine, dopexamine, 5-aminoethylpyrogallol, and salts thereof, including hydrohalide salts such as hydrochloride and hydrobromide salts), hydroxyalkyl-substituted catechols (e.g., 3,4-dihydroxybenzyl alcohol, 4-hydroxymethyl catechol), alkenyl-substituted catechols (e.g., 3,4-dihydroxystyrene), halo-substituted catechols (e.g., 4-chloro catechol, 4-fluoro catechol, 3-fluoro catechol, 4,5-dichloro catechol, tetrabromo catechol, tetrachloro catechol), alkoxy-substituted catechols (e.g., 3-methoxy catechol, 4-methoxy catechol), aroxy-substituted catechols (e.g., 3-phenoxy catechol), aryl-substituted catechols (e.g., 4-phenyl catechol, 3,3',4,4'-tetrahydroxybibenzyl), carboxy-substituted catechols (e.g., 3,4-dihydroxyacetophenone, 3,4-dihydroxybutyrophenone, 4-(chloroacetyl)catechol, ethyl 3,4-dihydroxybenzoate), nitro-substituted catechols (e.g., 4-nitro catechol, 3,4-dinitro catechol), sulfo-substituted catechols (e.g., 4-sulfo catechol and salts thereof), amino-substituted catechols (e.g., 4-amino catechol, 6-amino dopamine and salts thereof, especially hydrohalide salts) and the like. Combinations of two or more different catechol compounds may be used.

Co-Reactant Compounds

One or more co-reactant compounds are reacted with one or more catechol compounds to form preformed reaction products useful in the present invention. Suitable co-reactant compounds (sometimes referred to herein as "functionalized co-reactant compounds") are compounds comprised of one or more (preferably two or more) functional groups per molecule reactive with the catechol compound(s) used. In particular, the reactive functional groups may be selected from the group consisting of (meth)acryl groups, secondary amino groups, primary amino groups, thiol groups and hydroxyl groups. In a preferred embodiment, at least one co-reactant compound is utilized which is comprised of two or more primary and/or secondary amino groups per molecule. According to further embodiments of the invention, the co-reactant compound comprises at least 3, 4, 5, 10, 15, 20, 25, 30, 35, 40, 45, 50, 75, 100, 200 or more reactive functional groups (e.g., (meth)acryl groups, secondary amino groups, primary amine groups, thiol groups and/or hydroxyl groups) per molecule. Where the co-reactant compound contains two or more reactive functional groups per molecule, the reactive functional groups may be the same as or different from each other.

Without wishing to be bound by theory, secondary amino groups, primary amino groups, thiol groups and hydroxyl groups may be considered to be nucleophilic functional groups capable of forming covalent bonds at one or more sites within the catechol compound(s) through nucleophilic reactions such as, for example, Michael addition reactions and the like. As used herein, the term (meth)acryl group refers to functional groups characterized by an acryl structure (—C(=O)CH=CH$_2$) or methacryl structure (—C(=O)C(CH$_3$)=CH$_2$), such as acrylate (—OC(=O)CH=CH$_2$), methacrylate (—(OC(=O)C(CH$_3$)=CH$_2$), acrylamide(—NHC(=O)CH=CH$_2$) or methacrylamide (—NHC(=O)C(CH$_3$)=CH$_2$). According to one embodiment of the invention, where a functionalized co-reactant compound comprising one or more (meth)acryl functional groups is employed, at least one catechol compound comprised of a primary amino, secondary amino, thiol or hydroxyl group is also used which is capable of reacting with the (meth)acryl functional group(s) (such as through a Michael-type addition reaction, for example).

The co-reactant compound may be monomeric, oligomeric or polymeric. Suitable co-reactant compounds include, for example, polyamines (e.g., polyethyleneimines), polythiols and polyalcohols, comprising a plurality of primary and/or secondary amino, thiol and/or hydroxyl groups per molecule. The functional groups may be substituted on aliphatic and/or aromatic carbon atoms.

In desirable embodiments of the invention, the co-reactant compound or combination of co-reactant compounds is soluble in water. For example, the co-reactant compound may have a solubility in water at 25° C. of at least 10 g/L, at least 50 g/L, at least 100 g/L or even higher. However, in other embodiments, the co-reactant compound(s) may be dispersible in water.

Advantageous embodiments of the invention include embodiments in which the at least one co-reactant compound includes at least one oligomeric or polymeric amine compound comprising a plurality of repeating units having structure —[CH$_2$CH$_2$NH]—. Such oligomeric and polymeric amine compounds may be linear or branched in structure. One or more polyethyleneimines, either linear or branched, may be used as the co-reactant compound(s), in accordance with desirable embodiments of the invention. The polyethyleneimine may have, for example, a number average molecular weight of 200 to 100,000, 500 to 50,000 or 800 to 25,000 (as measured by gel permeation chromatography), although higher molecular weight polyethyleneimines (e.g., having number average molecular weights up to 2,000,000) may also be utilized. Modified polyethyleneimines, such as ethoxylated polyethyleneimines, also are suitable for use. Polyethyleneimines may be prepared by ring-opening polymerization of aziridine, for example.

Other illustrative, non-limiting examples of suitable co-reactant compounds include amines corresponding to the structural formula $H_2N(CH_2CH_2NH)_nCH_2CH_2NH_2$, where n is 0 or an integer of from 1 to 10, polyether polyols, polyester polyols, amine-terminated polyether polyols, thiol-terminated polyether polyols, polyvinyl alcohols, polyallylamines, polythiol alkanes (optionally containing one or more ether oxygens), polyvinylamines and the like. The functionalized co-reactant compound(s) may be linear or branched in structure (including hyper-branched and dendritic structures).

Examples of suitable co-reactant compounds comprised of one or more (meth)acryl functional groups include methacrylamidoethyl ethylene urea.

Methods of Making Preformed Catechol Compound/Co-Reactant Compound Reaction Products The preformed reaction products of catechol compounds and functionalized co-reactant compounds used in the methods of the present invention may be prepared using any suitable technique known in the art. For example, the reaction may be carried out under oxidative conditions and/or conditions effective to achieve condensation of the catechol compound(s) and the functionalized co-reactant compound(s), thereby forming a polymeric reaction product. The precise reaction mechanisms are not well understood and the reaction products obtained are generally complex in structure. However, in at least some cases, it is believed that at least a portion of the reaction proceeds by way of Michael addition of a nucleophile (a Michael donor) in one of the reactants to an electrophilic site (a Michael acceptor) in another reactant. For example, where the co-reactant compound contains an amino (primary or secondary), thiol or hydroxyl group, such nucleophilic functional group may add to the catechol compound via a Michael addition-type reaction. As another example, where the catechol compound contains a nucleophilic group such as a primary or secondary amino group, such nucleophilic group may add to a (meth)acryl group in the co-reactant compound (again, by way of a Michael addition-type mechanism). Such Michael addition-type reactions typically result in the formation of covalent heteroatom-carbon bonds (e.g., nitrogen-carbon covalent bonds). However, other types of reactions resulting in the formation of covalent bonds between the reactants may also take place. Internal reaction of one or more of the reactants may also occur; for example, when the catechol compound is an aminoethyl-substituted catechol such as dopamine, cyclization of the aminoethyl group to form an indole group may be observed. Carbon-carbon and/or nitrogen-nitrogen coupling reactions may also take place.

According to at least certain aspects, the catechol compound(s), the functionalized co-reactant compound(s) and the preformed reaction product(s) are all soluble in water. However, in other embodiments, one or more of the catechol compound(s), the functionalized co-reactant compound(s) and/or the preformed reaction product(s) are dispersible in water.

Exemplary methods of forming reaction products suitable for use in accordance with the present invention may comprise the following steps:

a) forming a reaction mixture comprised of an aqueous mixture of at least one catechol compound and at least one co-reactant compound comprised of one or more functional groups reactive with the at least one catechol compound (e.g., one or more functional groups selected from the group consisting of (meth)acryl groups, secondary amino groups, primary amino groups, thiol groups and hydroxyl groups); and b) reacting the reaction mixture under oxidative conditions (for example, conditions selected such that molecular oxygen is introduced into the reaction mixture, in the form of air or other molecular oxygen-containing gas; oxidants other than molecular oxygen may also be employed) for a time sufficient to react the at least one catechol compound with the at least one co-reactant compound to form at least one preformed reaction product; and c) optionally, purifying the at least one preformed reaction product.

Oxidative conditions may be provided by introducing molecular oxygen ($O_2$) and/or other oxidants (oxidizing agents) into the reaction mixture. Suitable illustrative oxidants include, in addition to molecular oxygen, ozone, peroxide compounds (e.g., hydrogen peroxide), persulfates and the like.

Oxygen may be introduced into the reaction mixture by methods known to those of skill in the art, including by way of non-limiting example, bubbling or sparging air or oxygen into the reaction mixture, shaking or stirring the reaction mixture to introduce air bubbles and the like. Reaction conditions include maintaining a temperature in a range of about 10° C. to about 100° C., desirably in a range of 14° C. to 60° C., and preferably about 20 to 50° C. for a period of time sufficient to form the desired quantity of preformed reaction products of the catechol compound(s) and functionalized co-reactant compound(s). Higher reaction temperatures (e.g., temperatures above 100° C.) may also be employed, particularly where the reaction is carried out under pressure or in a sealed vessel. Reaction conditions generally are selected such that the reaction mixture remains liquid. Reaction time may range from 1 to 20 hours, desirably from about 3 to about 14 hours, and in one embodiment can be from 5 to 7 hours. The reaction time in other embodiments may be as little as 30 minutes, depending upon the reactivity of the catechol compound(s) and co-reactant compound(s), the reaction temperature and pressure, and oxidant (e.g., $O_2$) availability, among other factors, provided such conditions do not negatively affect the performance of the resulting reaction product(s) to an unacceptable extent. The reaction product(s) may be produced in a continuous synthesis process, using any of the procedures known in the polymer art; in such a process, a residence time of as little as 5 to 30 minutes may be employed.

In one embodiment, a preformed reaction product suitable for using in the form of an aqueous mixture as a rinse after cleaning a metal substrate surface and/or before applying a conversion coating to a metal substrate surface may be prepared by a method comprising the following steps: a) providing an aqueous reactant mixture of at least one catechol compound (e.g., dopamine or a hydrohalide salt of dopamine) and at least one co-reactant compound comprised of one or more functional groups selected from the group consisting of (meth)acryl groups, secondary amino groups, primary amino groups, thiol groups and hydroxyl groups (e.g., a polyethyleneimine); and b) stirring the aqueous reactant mixture with vigorous vortex inducing stirring at a temperature of 20 to 50° C. for a period of time from 5 to 7 hours to thereby form preformed reaction products of the catechol compound(s) and co-reactant compound(s).

The molar ratio of catechol compound(s) to reactive functional groups ((meth)acryl, amino, thiol, hydroxyl) in the co-reactant compound(s) is not believed to be particularly critical. However, in certain embodiments, a molar ratio of catechol compound(s) to reactive functional groups in the co-reactant compound(s) is from 1:0.05 to 1:25 or 1:0.05 to 1:10. In one embodiment, a molar excess of reactive functional groups relative to catechol compound is utilized. However, it will generally be desirable to select a molar ratio which is effective to provide preformed reaction products which are water-soluble, e.g., preformed reaction products which have a solubility in water at 25° C. of at least 0.1, at least 1, at least 5 or at least 10% by weight. The amount by weight of catechol compound need not be particularly high; that is, preformed catechol compound/functionalized co-reactant compound reaction products that are effective in enhancing the oxidation resistance of a bare metal substrate surface may be prepared using relatively low weight amounts of catechol compound (e.g., 5 to 25, 5 to 20, or 5 to 15% by weight in total of catechol compound(s) based on the total weight of catechol compound and functionalized co-reactant compound).

The preformed reaction products obtained may be subjected to one or more purification steps prior to being used in a pre-rinse solution in accordance with the present invention. Such methods include, by way of illustration, filtration, dialysis, membrane treatment, ion exchange, chromatography and the like and combinations thereof. For example, halide salts may be formed as by-products, depending upon the reactants used to prepare the preformed reaction product. If the presence of such halide salts (chloride salts, in particular) is determined to be detrimental to the performance of the pre-rinse solution, they may be removed or reduced by any suitable method, such as treatment with an ion exchange resin capable of exchanging a less harmful anion for the halide. If unreacted catechol compound and/or unreacted co-reactant compound is present, together with preformed reaction product, such unreacted materials may, if so desired, be removed before using the preformed reaction product in a rinse step. In certain embodiments of the invention, however, the aqueous mixture when used as a pre-rinse additionally is comprised of unreacted catechol compound(s), unreacted co-reactant compound(s), or both unreacted catechol compound(s) and unreacted co-reactant compound(s) in addition to preformed reaction product. An advantage of the present invention is that aqueous mixtures (e.g., aqueous solutions or aqueous dispersions, which preferably are storage-stable) of preformed catechol compound/functionalized co-reactant compound reaction products may be prepared in advance and conveniently stored in stable solution form until such time as it is desired to contact the preformed catechol compound/functionalized co-reactant compound reaction products with a bare metal substrate surface. Thus, forming the reaction products in situ during a pre-rinse operation, which would likely lead to significant delays in processing time, is not necessary.

As used herein, the term "storage-stable" when referring to a mixture (whether a solution or a dispersion) means that the mixture after being stored in a sealed container over a period of observation of at least 3 months at 20° C., during which the mixture is mechanically undisturbed, exhibits no phase separation and no precipitation or settling out of any material that is visible to the unaided human eye.

Pre-Rinse Solutions

According to aspects of the invention, an aqueous mixture of at least one preformed reaction product of at least one catechol compound and at least one co-reactant compound comprised of one or more functional groups reactive with the at least one catechol compound is brought into contact with a bare metal substrate surface. Such an aqueous mixture (which may be in the form of a solution or a dispersion and preferably is a storage-stable mixture) may be formed by any suitable method. For example, where the at least one preformed reaction product is obtained as an aqueous dispersion or solution (as a result of carrying out the reaction of catechol compound and functionalized co-reactant compound while the reactants are dispersed or dissolved in water, for example), such an aqueous mixture may be used directly or after dilution of the aqueous mixture to a particular desired end-use concentration. Water alone may be used for such dilution, but in other embodiments of the invention it is contemplated that one or more other types of components may be included in the aqueous mixture. For example, an acid, base or buffer may be combined into the aqueous solution to modify its pH characteristics. The aqueous mixture in certain embodiments of the invention is basic, but in other embodiments may be acidic or neutral. In certain embodiments of the invention, the pH of the aqueous mixture, when contacted with a bare metal substrate surface (i.e., when used in a working pre-rinse bath) may be from 4.5 to 11, from 5 to 11.5, from 7 to 10.5, from 7 to 11, from 7 to 10, from 8.5 to 10, or from 8 to 10, for example.

As used (i.e., when contacted with a bare metal substrate surface), the aqueous mixture may have a concentration of preformed catechol compound/co-reactant compound reaction product of, for example, 5 to 10,000 ppm, 5 to 5000 ppm, 5 to 4000 ppm, 5 to 3000 ppm, 5 to 2000 ppm, 5 to 1500 ppm, 5 to 1000 ppm, 5 to 750 ppm or 5 to 500 ppm.

Also contemplated by the present invention is the utilization of concentrates comprising water and preformed catechol compound/co-reactant compound reaction product(s), wherein the concentration of preformed reaction product is higher than the desired concentration of preformed reaction product in the aqueous mixture to be contacted with a bare metal substrate surface. The concentrate may be combined with an amount of water effective to achieve such desired end-use concentration, prior to treatment of a bare metal substrate surface in accordance with the present invention. The concentration of preformed catechol compound/co-reactant compound reaction product in such a concentrate may be, for example, 0.25 to 90% by weight or 1 to 75% by weight.

An aqueous mixture (working bath) repeatedly contacted with bare metal substrate surfaces can, over time, become depleted with respect to the concentration of preformed catechol compound/co-reactant compound reaction product. Should this happen, the aqueous mixture in the working bath may be replenished by addition of an amount of preformed catechol compound/co-reactant compound reaction product (in concentrate form, for example) effective to restore the desired concentration. Further, it is understood that a repeatedly used working bath containing the aqueous mixture may accumulate some amount of various components carried over from a cleaning stage, such as alkaline builders (sodium hydroxide, potassium hydroxide, alkali metal carbonates, alkali metal bicarbonates, phosphates, silicates), surfactants and oil/grease/dirt contaminants. When the levels of such components reach a point where the performance of the working bath or the quality of the conversion coated metal substrates being processed becomes adversely affected, the contents of the working bath may be discarded and replaced or treated to remove or reduce such components or otherwise counteract their effect (by pH adjustment and/or ion exchange, for example).

Use of Pre-Rinse Solutions

An aqueous mixture comprised of preformed catechol compound/co-reactant compound reaction product(s) is contacted with a cleaned surface of a metal substrate, in accordance with the present invention. Such contacting may be accomplished by any suitable method, such as, for example, spraying, immersion, dipping, brushing, roll-coating or the like. Typically, the aqueous mixture during such contacting is maintained at a temperature of from ambient temperature (e.g., room temperature) to a temperature moderately above ambient temperature. For instance, the temperature of the aqueous mixture in a working bath may be from 10 to 54° C., from 16 to 49° C. or from 32 to 43° C.

The contact time should be selected to be a time sufficient to deposit an effective amount of preformed catechol compound/co-reactant compound on the bare metal substrate surface, which may generally be regarded as an amount effective to reduce the amount of oxidation (e.g., flash rusting) on the surface of the metal substrate once the surface is exposed to air, as compared to a control where the bare metal substrate surface is contacted with water alone under the same conditions. Typically, contact times of from 0.1 to 30 minutes (e.g., 5 seconds to 20 minutes, or 10 seconds to 20 minutes, or 30 seconds to 6 minutes) will be suitable.

Once the desired contact time has been reached, contacting is discontinued and the pre-rinsed metal substrate may be taken on to further processing steps. For example, spraying may be stopped or the article comprising the pre-rinsed metal substrate may be removed from an immersion bath. Residual or surplus aqueous mixture may be permitted to drain from the rinsed surface of the metal substrate. Removal of residual or surplus aqueous solution can be accomplished by any suitable method or combination of methods, such as drip-drying, squeegeeing, wiping, draining or rinsing with water. According to certain embodiments, the pre-rinsed metal substrate surface may be dried (e.g., air-dried, heat or oven dried). In other embodiments, the pre-rinsed metal substrate is not dried before proceeding with further processing steps such as conversion coating.

Metal Substrates

The present invention is particularly useful in connection with the treatment of metal substrate surfaces that are susceptible to oxidation once cleaned, especially bare metal surfaces that exhibit flash-rusting when exposed to molecular oxygen (e.g., air). Ferrous (iron-containing) metal substrates may be treated in accordance with the present invention, for example. Exemplary metal substrates include, without limitation, iron; steel substrates such as cold rolled steel, hot rolled steel, and stainless steel; steel coated with zinc metal, zinc alloys such as electrogalvanized steel, galvalume, galvanneal, and hot-dipped galvanized steel; magnesium alloys; aluminum alloys and aluminum plated steel substrates. A component or article containing more than one type of metal substrate can be processed in accordance with the procedures set forth herein. The present invention may also be practiced using metal substrates in which an iron-containing component or layer is covered with a metal coating that does not contain iron (e.g., a zinc coating), wherein the iron-containing component or layer becomes exposed as a result of cutting, forming, fitting, sanding, grinding, polishing, scoring or other such operations.

Cleaning Step

As used herein, the term "bare metal substrate surface" refers to the metallic surface of a metal substrate which is essentially free of any contaminants and which is not conversion coated or coated with some other substance. According to certain aspects of the invention, the bare metal substrate surface to be treated with preformed catechol compound/functionalized co-reactant compound reaction products is obtained by cleaning a contaminated metal substrate surface (in particular, a metal substrate surface that would be a bare metal substrate surface but for the presence of surface contaminants such as dirt, grease, oil and the like). For example, prior to contacting a metal substrate surface with an aqueous mixture comprised of a preformed catechol compound/co-reactant compound reaction product in accordance with the present invention, the surface may be cleaned to remove grease, oil, dirt or other extraneous materials and contaminants using any of the cleaning procedures and materials known or conventionally used in the art, including for example mild or strong alkaline cleaners, neutral cleaners and acidic cleaners. Methods of cleaning metal surfaces are described, for example, in Murphy, "Metal Surface Treatments, Cleaning", Kirk-Othmer Encyclopedia of Chemical Technology, 2000. Aqueous as well as non-aqueous (i.e., organic solvent-based) cleaners may be employed. Components of suitable cleaners may include, for example, inorganic bases (alkali metal hydroxides, alkali metal carbonates, alkali metal bicarbonates, for example), builders (e.g., phosphates, silicates), surfactants, water, organic solvents and the like. Examples of alkaline cleaners include Parco® cleaner ZX-1, Parco® cleaner 315, and Bonderite® C-AK T51, each of which is available from Henkel Corporation, Madison Heights, Michigan. The cleaner may be applied to and contacted with the metal substrate surface using any method known to be suitable for removing contaminants, such as spraying, immersion, wiping and so forth. The temperature during such contacting may be, for example, from about room temperature to a temperature somewhat above room temperature (e.g., 20° C. to 50° C.). The duration of the contacting between the cleaner and the metal substrate may be any time effective to achieve the desired extent of contaminant removal (for example, from 10 seconds to 5 minutes). Mechanical action may be utilized to assist in contaminant removal. While typically the cleaners used for such purpose are in liquid or solution form, it is also possible to clean metal substrate surfaces using mechanical means alone, such as sanding, sand blasting or blasting with other dry media. The metal substrate, following a cleaning step, may optionally be subjected to one or more further steps prior to being contacted with a solution or dispersion comprising one or more preformed catechol compound/co-reactant compound reaction products. For example, the metal substrate surface may be rinsed one or more times with water and/or an aqueous acidic solution, after cleaning.

A bare metal substrate surface may also be prepared by methods of forming or finishing metal articles which result in bare metal surfaces being generated, such as cutting, scoring, filing, grinding, abrasion, sanding and the like.

Conversion Coating Step

Subsequent to a step comprising contacting a bare metallic surface of a metal substrate with an aqueous mixture comprised of preformed catechol compound/co-reactant compound reaction product(s), the metal substrate surface is subjected to a conversion coating step. The conversion coating step may be carried out immediately after the contacting step or after a further rinsing step as described above, or after an extended period of time following the contacting step. Exposing the bare metal substrate surface to such an aqueous mixture, whereby some amount of preformed catechol compound/co-reactant compound reaction product is deposited on the bare metal substrate surface, helps to protect the metal substrate surface from oxidation. The present invention thus is quite useful in coating operations in which a coating line may be interrupted for a period of time or where bare metal substrates are to be stored before being conversion coated.

Any known conversion coating technology may be practiced in connection with the present invention. Conversion coatings are coatings for metals in which the surface of a metal is converted into the coating with a chemical or electro-chemical process. Examples include chromate conversion coatings, phosphate conversion coatings (e.g., iron phosphate coatings, zinc phosphate coatings), phosphate-free conversion coatings, Group IV metal oxide coatings (e.g., zirconium oxide coatings), bluing, black oxide coatings on steel, and anodizing. In typical chemical conversion coating processes, a metal substrate surface (which may have been previously cleaned and/or rinsed) is contacted with a conversion coating composition for a time and at a temperature effective to form a conversion coating layer on the metal substrate surface, the optimum or suitable conditions being determined by the nature of the metal substrate surface and the components present in the conversion coating composition, with such conditions being familiar to or readily ascertained by those skilled in the art. Conversion coatings may be used for corrosion protection, to add decorative color or appearance to a metal substrate and as paint primers.

For example, the conversion coating step may involve the use of an acidic aqueous conversion coating composition comprised of one or more Periodic Table Group IV metals such as Zr, Ti and Hf, typically containing other components as well (such as a metal etchant (e.g., fluoride), optionally also copper and/or nitrate and/or zinc and/or Si-based substances). Such conversion coating compositions are sometimes referred to as Group IV metal oxide-depositing conversion coating compositions (e.g., zirconium oxide-depositing conversion coating compositions). One such conversion coating composition is known as Bonderite® M-NT 1820, sold by Henkel, which is based on Zr as the Group IV metal. The aqueous acidic conversion coating may, for example, have a pH of 5.0 or less and comprise: 50 to 750 ppm of at least one Group IV metal; 0 to 50, 1 to 50 or 5 to 50 ppm of copper; 10 to 100 ppm of free fluoride; optionally, greater than 3500 ppm of nitrate; and, optionally, Si-based substances such as silanes, $SiO_2$, silicates and the like.

In one embodiment, a conversion coating composition (in particular, a Group IV metal oxide-depositing conversion coating composition) may be applied to a surface of a pre-rinsed reactive metal substrates by contacting the metal substrate with the conversion coating composition for approximately 2 minutes at a temperature of 24-40° C. Contacting may be accomplished by any suitable means including but not limited to dipping, spraying, roll-coating and the like. Contact times and temperatures may be varied, but are typically less than 10, preferably less than 5 minutes. Desirably contact time is at least about 1, 3, 5, 10, 15, 20, 30, 40, 50 or 60 seconds and is no more than about 9, 8, 7, 6, 5, 4, 3 or 2 minutes. Desirably temperature ranges from at least about 21, 22, 23, 24, 25, 26, 27, 28, 29, 30, 31 or 32° C. and no more than about 40, 39, 38, 37, 36, 35, 34 or 33° C., Higher or lower temperatures, for example at least greater than the freezing point of the bath and up to 50° C., may be employed provided that they do not interfere with deposition of the conversion coating or negatively affect the metal pretreatment working bath or performance of the conversion coating.

The present invention may also be practiced wherein the conversion coating step involves phosphating, whereby metal phosphate (e.g., zinc phosphate) conversion coatings are formed on metal substrate surfaces. Zinc phosphating is a type of conversion coating well known in the art, wherein a metal substrate is contacted with a zinc phosphating composition. Present day zinc phosphate coating solutions are dilute aqueous solutions of phosphoric acid, zinc and other chemicals (e.g., other metal cations such as nickel and/or manganese as well as other types of ions such as nitrate, nitrite, chlorate, fluoroborate and/or silicofluoride) which, when applied to the surface of a metal react with the metal surface forming an integral layer on the surface of the metal of a substantially insoluble zinc phosphate coating, which may be amorphous or crystalline. The zinc phosphating compositions sold by Henkel Corporation under the brand name "Bonderite" may be utilized such as, for example, Bonderite® M-ZN 958.

After contacting a metal substrate surface with a conversion coating composition, the conversion coated metal substrate may optionally be rinsed, for example with water and/or with a post-rinse solution or dispersion (sometimes referred to in the art as a "sealer") which further enhances the corrosion resistance of the conversion coated metal substrate surface.

Application of Additional Coatings

Following conversion coating and optionally, one or more post-rinsing (or "sealing") steps, the metal substrate may be subjected to one or more further processing steps, including in particular the application of a paint or other decorative and/or protective coating. In such applications, the conversion coating may function as a primer or anti-corrosion layer. Any such coating known in the art may be employed, including for example, electrophoretic coatings (E-coatings), solvent-borne paints, aqueous-borne paints, powder coating and the like.

Accordingly, the present invention may be practiced in accordance with the following exemplary multi-step process:

1) cleaning of a metal substrate surface;
2) rinsing of the cleaned (bare) metal substrate surface with an aqueous mixture comprised of preformed catechol compound/functionalized co-reactant reaction product(s);
3) conversion coating of the cleaned and rinsed metal substrate surface;
4) optionally, rinsing of the conversion-coated metal substrate surface with water and/or a post-rinse solution or dispersion;
5) electrophoretic coating of the optionally rinsed conversion-coated metal substrate surface;
6) rinsing of the electrophoretic-coated metal substrate surface with water; and
7) baking of the rinsed electrophoretic-coated metal substrate.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of a composition, article or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

1.8 grams of dopamine hydrochloride and 15.0 grams of Lupasol® FG (BASF polyethyleneimine, molecular weight about 800) were dissolved in 405 grams of deionized water and allowed to react with vigorous agitation for 6 hours at ambient temperature (20-25° C.). Vigorous agitation is used to introduce oxygen to the reaction mixture, which participates in/promotes the desired reaction between the dopamine hydrochloride and the polyethyleneimine. The product thereby obtained is referred to hereafter as "Dopamine/PEI Reaction Product A."

Dopamine/PEI Reaction Product A was incorporated into a rinse solution at a concentration of 200 ppm (0.2 grams/L). The solution was evaluated as follows: ACT CRS panels were processed as outlined and examined for visual oxidation (red-rust). For comparison, DI water and sodium nitrite solutions were evaluated as controls.

Process:
Clean: Bonderite® C-AK T51; 49° C.; 90 second spray; Free Alkalinity=5.5 pts.; pH=11.7
Rinse: City Water; 43° C.; 60 second spray
Rinse: Test solutions
 1. DI Water; 21° C.; pH=6.8; various times of immersion
 2. Nitrite (135 ppm); 21° C.; pH=8.7; various times of immersion
 3. Dopamine/PEI Reaction Product A (200 ppm); 21° C.; pH=9.5; various times of immersion
Air dry: Forced air; 90 psi
Results:

|  | Application Time, minutes | | |
| --- | --- | --- | --- |
|  | 1 | 10 | 20 |
| Candidate | Visual Observations | | |
| DI water | Flash-rust ~10% | Flash-rust ~50% | Flash-rust >50% |
| Nitrite | No rust | No rust | No rust |
| Dopamine/PEI Reaction Product A | No rust | No rust | No rust |

The 10 and 20 minute application times were utilized to simulate long dwell times or line stoppage in the rinse stage. The percentage of flash-rust indicates the area of surface covered with visible red-rust.

FTIR and GDOES depth profiles were obtained on the samples prepared using a 10 minute application time. These results indicated that Dopamine/PEI Reaction Product A deposits on the surface of the metal and effectively protected the surface from oxidation.

Example 2

Dopamine/PEI Reaction Product A was incorporated into a rinse solution at a concentration of 200 ppm. The solution was evaluated as follows: ACT CRS panels were processed as outlined and examined for visual oxidation (red-rust). For comparison, DI water and sodium nitrite were evaluated as controls.

Process:
Clean: Bonderite® C-AK T51; 49° C.; 90 second spray; Free Alkalinity=5.5 pts.; pH=11.7
Rinse: City Water; 43° C.; 60 second spray
Rinse: Test solutions
 1. DI Water; 21° C.; pH=8.5 (adjusted with ammonium bicarbonate); 10 minute immersion
 2. Nitrite (135 ppm); 21° C.; pH=8.7; 10 minute immersion
 3. Dopamine/PEI Reaction Product A (200 ppm); 21° C.; pH=9.5; 10 minute immersion
Air dry: forced air; 90 psi
Results:

| Candidate | Visual Observations |
| --- | --- |
| DI water | Flash-rust >80% |
| Nitrite | No rust |
| Dopamine/PEI Reaction Product A | Flash-rust ~5% |

In the test involving Dopamine/PEI Reaction Product A, some corrosion is present in localized areas, which is believed to be possibly due to the presence of 4 ppm chloride ion in the solution.

The 10 minute application times were utilized to simulate long dwell times or line stoppage in the rinse stage. The percentage of flash-rust indicates the area of surface covered with visible red-rust.

Example 3

Dopamine/PEI Reaction Product A was purified with Dow Amberlite® IRN78 ion exchange resin to remove the chloride ion. The resulting product, Dopamine/PEI Reaction Product B, was incorporated into a rinse solution at a concentration of 200 ppm. The solution (which contained <1 ppm chloride ion) was evaluated as follows: ACT CRS panels were processed as outlined and examined for visual oxidation (red-rust). For comparison, DI water and sodium nitrite solutions were evaluated as controls.

Process:
Clean: Bonderite® C-AK T51; 49° C.; 90 second spray; Free Alkalinity=5.5 pts.; pH=11.7
Rinse: City Water; 43° C.; 60 second spray
Rinse: Test solutions
 1. DI Water; 25° C.; pH=6.8; 10 minute immersion
 2. Nitrite (135 ppm); 25° C.; pH=8.7; 10 minute immersion
 3. Dopamine/PEI Reaction Product B (200 ppm); 25° C.; pH=9.5; 10 minute immersion
Air dry: Forced air; 90 psi Results:

| Candidate | Visual Observations |
| --- | --- |
| DI water | Flash-rust ~50% |
| Nitrite | No rust |
| Dopamine/PEI Reaction Product B | No rust |

Example 4

Dopamine/PEI Reaction Product A was incorporated into a rinse solution at a concentration of 200 ppm. The solution was evaluated as follows: ACT CRS panels were processed as outlined and examined for visual oxidation (red-rust). For comparison, DI water and sodium nitrite were evaluated as controls.

Process:
Clean: Bonderite® C-AK T51; 49° C.; 90 second spray; Free Alkalinity=5.5 pts.; pH=11.7
Rinse: City Water; 43° C.; 60 second spray
Rinse: Test solutions
  1. DI Water; 21° C.; pH=6.9; 1 and 10 minute immersion
  2. Nitrite (135 ppm); 21° C.; pH=8.7; 1 and 10 minute immersion
  3. Dopamine/PEI Reaction Product A (200 ppm); 21° C.; pH=9.5; 1 and 10 minute immersion
Air dry: 10 minute dwell (natural air dry)
Results:

| Candidate | 1 minute Visual Observations | 10 minute Visual Observations |
| --- | --- | --- |
| DI water | Flash-rust ~10% | Flash-rust >50% |
| Nitrite | No rust | No rust |
| Dopamine/PEI Reaction Product A | No rust | No rust |

The 10 minute application times were utilized to simulate long dwell times or line stoppage in the rinse stage. The percentage of flash-rust indicates the area of surface covered with visible red-rust.

Example 5

This example demonstrates the effect of a pre-rinse using a solution of Dopamine/PEI Reaction Product B on subsequent zirconium deposition from a conversion coating composition.

Dopamine/PEI Reaction Product B was used to prepare rinse stages at two conditions.
  1. Dopamine/PEI Reaction Product B: 100 ppm; pH=9.8
  2. Dopamine/PEI Reaction Product B: 200 ppm; pH=9.8
Application Process:
Clean: Bonderite® C-AK T51; 49° C.; 90 second spray; Free Alkalinity=5.5 pts.; pH=11.7
Rinse: City Water; 43° C.; 60 second spray
Rinse: Test solutions; 24° C.; 1 minute immersion
Conversion Coating: Bonderite® M-NT 1820; 32° C.; various application times (30, 60, 120 seconds) immersion. Zr=150 ppm; Cu=20 ppm; Zn=600 ppm; Si=50 ppm; FF=25 ppm; pH=4.0
Rinse: DI water; 24° C.; 1 minute spray
Air dry; forced air; 90 psi
Results: Zirconium Coating Weight, $Mg/m^2$

| | Conversion Coating Application | | |
| --- | --- | --- | --- |
| Candidate | 30 seconds | 60 seconds | 120 seconds |
| DI water | 32 | 56 | 109 |
| Dopamine/PEI Reaction Product B (100 ppm) | 30 | 53 | 99 |
| Dopamine/PEI Reaction Product B (200 ppm) | 31 | 54 | 90 |

The pre-rinses using a solution of Dopamine/PEI Reaction Product B were found to slightly reduce the amount of zirconium deposited by the conversion coating stage.

Example 6

Dopamine/PEI Reaction Product B was used in a pre-rinse application followed by a zirconium oxide conversion coating system. ACT CRS panels were coated as follows.
Process:
Clean: Bonderite® C-AK T51; 49° C.; 60 second spray; Free Alkalinity=5.5 pts.; pH=11.7
Clean: Bonderite® C-AK T51; 49° C.; 120 second immersion; Free Alkalinity=5.5 pts.; pH=11.7
Rinse: City Water; 43° C.; 60 second spray
Rinse: Test solutions; 24° C.; 1 minute immersion
  1. DI water; pH=6.8
  2. Dopamine/PEI Reaction Product B (200 ppm); pH=9.5
Conversion Coating: Bonderite® M-NT 1820; 32° C.; 120 second immersion. Zr=150 ppm; Cu=20 ppm; Zn=600 ppm; Si=50 ppm; FF=25 ppm; pH=4.0
Rinse: DI water; 24° C.; 1 minute spray
E-coat: BASF CathoGuard® 800; 230V; 35° C.; 134 second immersion
Rinse: DI water; 21° C.; 60 second spray
Bake: 182° C.; 40 minutes
Panels were tested for corrosion resistance using GMW14872 (26 cycles).
Results:

| Candidate | Average Creep, mm |
| --- | --- |
| Bonderite ® M-NT 1820 Control | 3.1 |
| Dopamine/PEI Reaction Product B Pre-rinse (200 ppm) Bonderite ® M-NT 1820 | 2.9 |

Note:
3 replicates were performed.

Based on these results, it was concluded that rinsing with a solution of Dopamine/PEI Reaction Product B prevents flash-rust and provides equivalent corrosion performance (as compared to rinsing with DI water).

Example 7

The following tests were prepared to examine the E-coat paint appearance and the effect of using a solution of a preformed dopamine/PEI reaction product as a pre-rinse to prevent flash-rust. ACT CRS panels were tested without surface modification (control), sanded (200 grit, 8 circular rotations by hand), and stone abrasion (GM silicate stone, 3 double-rubs). These surface modifications were performed to simulate body-shop metal finishing activities. These surface activities are understood to activate the metal surface and increase the risk of oxidation. Samples were then treated in accordance with the following procedure.

Process:
Clean: Bonderite® C-AK T51; 49° C.; 60 second spray; Free Alkalinity=5.5 pts.; pH=11.7
Clean: Bonderite® C-AK T51; 49° C.; 120 second immersion; Free Alkalinity=5.5 pts.; pH=11.7
Rinse: City Water; 43° C.; 60 second spray
Rinse: Test solutions; 24° C.; various applications
 1. DI water; 60 second spray; pH=6.8
 2. DI water; 60 second immersion; pH=6.8
 3. DI water; 10 minute immersion; pH=6.8
 4. DI water; 20 minute immersion; pH=6.8
 5. Dopamine/PEI Reaction Product B (200 ppm in water); 60 second immersion; pH=9.8
 6. Dopamine/PEI Reaction Product B (200 ppm in water); 10 minute immersion; pH=9.8
 7. Dopamine/PEI Reaction Product B (200 ppm in water); 20 minute immersion; pH=9.8
Conversion Coating: Bonderite® M-NT 1820; 32° C.; 120 second immersion. Zr=150 ppm; Cu=20 ppm; Zn=600 ppm; Si=50 ppm; FF=25 ppm; pH=4.0
Rinse: DI water; 24° C.; 1 minute spray
E-coat: BASF CathoGuard® 800; 230V; 35° C.; 134 second immersion
Rinse: DI water; 24° C.; 60 second spray
Bake: 182° C.; 35 minutes Results:

| | Candidate | Coating Appearance | Paint Appearance |
|---|---|---|---|
| 1. | DI, 1 min. spray | No rust | Smooth/uniform |
| 2. | DI, 1 min. immersion | No rust | Smooth/uniform |
| 3. | DI, 10 min. immersion | Flash-rust ~10% | Smooth/uniform |
| 4. | DI, 20 min. immersion | Flash-rust ~50% | Raised mapping defect |
| 5. | Dopamine/PEI Reaction Product B, 1 min. | No rust | Smooth/uniform |
| 6. | Dopamine/PEI Reaction Product B, 10 min. | No rust | Smooth/uniform |
| 7. | Dopamine/PEI Reaction Product B, 20 min. | No rust | Smooth/uniform |

Note:
3 replicates per test

Pre-rinsing with the solution of the Dopamine/PEI Reaction Product B was found to be effective in preventing flash-rust and E-coat mapping.

Example 8

The following example demonstrates the performance of a Dopamine/PEI reaction product pre-rinse using two materials. Dopamine/PEI Reaction Product C is a replicate of Dopamine/PEI Reaction Product A and Dopamine/PEI Reaction Product D is a replicate of Dopamine/PEI Reaction Product B (purified to remove Cl). The example also demonstrates the performance of the inventive pre-rinse step in conjunction with conversion coating solutions at [Cu]=20 ppm and [Cu]=30 ppm. ACT CRS panels were treated as follows.
Process:
Clean: Bonderite® C-AK T51; 49° C.; 90 second spray; Free Alkalinity=5.5 pts.; pH=11.7
Rinse: City Water; 43° C.; 60 second spray
Rinse: Test solutions; 24° C.; 1 minute immersion
 1. DI water; pH=6.9
 2. Dopamine/PEI (200 ppm); pH=9.5
Conversion Coating: Bonderite® M-NT 1820; 32° C.; 120 second immersion. Zr=150 ppm; Cu=20 ppm or 30 ppm; Zn=600 ppm; Si=50 ppm; FF=20 ppm; pH=4.0
Rinse: DI water; 24° C.; 1 minute spray
E-coat: BASF CathoGuard® 800; 230V; 35° C.; 134 second immersion
Rinse: DI water; 21° C.; 60 second spray
Bake: 182° C.; 35 minutes
Results:

Paint adhesion was tested in accordance with GMW14829/14704. Results are reported as percentage of paint remaining.

| Candidate | Initial | 24 Hr soak at 63° C. | 48 Hr soak at 63° C. |
|---|---|---|---|
| Bonderite ® 1820 control | 100 | 100 | 99 |
| Pre-rinse with Dopamine/PEI Reaction Product C + Bonderite ® 1820 with 20 ppm Cu | 100 | 100 | 100 |
| Pre-rinse with Dopamine/PEI Reaction Product C + Bonderite ® 1820 with 30 ppm Cu | 100 | 100 | 100 |
| Pre-rinse with Dopamine/PEI Reaction Product D + Bonderite ® 1820 with 20 ppm Cu | 100 | 100 | 100 |
| Pre-rinse with Dopamine/PEI Reaction Product D + Bonderite ® 1820 with 30 ppm Cu | 100 | 100 | 100 |

Note:
3 replicates were performed.

Based on these results, it was concluded that pre-rinsing with solutions of preformed dopamine/PEI reaction product is not detrimental towards paint adhesion.

Corrosion resistance was evaluated using a Hot Salt Water Soak procedure (10 days).

| Candidate | Creep, U/2 (mm) |
|---|---|
| Bonderite ® 1820 control | 6.5 |
| Pre-rinse with Dopamine/PEI Reaction Product C + Bonderite ® 1820 with 20 ppm Cu | 5.3 |
| Pre-rinse with Dopamine/PEI Reaction Product C + Bonderite ® 1820 with 30 ppm Cu | 4.5 |
| Pre-rinse with Dopamine/PEI Reaction Product D + Bonderite ® 1820 with 20 ppm Cu | 7.6 |
| Pre-rinse with Dopamine/PEI Reaction Product D + Bonderite ® 1820 with 30 ppm Cu | 4.3 |

Note:
3 replicates were performed.

Corrosion resistance was evaluated in accordance with GMW14872 (26 cycles).

| Candidate | Creep, mm |
|---|---|
| Bonderite ® 1820 control | 4.0 |
| Pre-rinse with Dopamine/PEI Reaction Product C + Bonderite ® 1820 with 20 ppm Cu | 3.2 |

-continued

| Candidate | Creep, mm |
|---|---|
| Pre-rinse with Dopamine/PEI Reaction Product C + Bonderite ® 1820 with 30 ppm Cu | 2.3 |
| Pre-rinse with Dopamine/PEI Reaction Product D + Bonderite ® 1820 with 20 ppm Cu | 3.0 |
| Pre-rinse with Dopamine/PEI Reaction Product D Bonderite ® 1820 with 30 ppm Cu | 2.9 |

Note:
3 replicates were performed.

Example 9

The following example demonstrates the effectiveness of pre-rinsing with a solution of a preformed dopamine/PEI reaction product to prevent flash-rust at elevated temperatures.

The preformed dopamine/PEI reaction product ("Dopamine/PEI Reaction Product E") was incorporated into a rinse solution at a concentration of 200 ppm. Dopamine/PEI Reaction Product E was prepared in accordance with the procedures of Example 1, but purified using Dow Amberlite® IRN78 to remove chloride ion. The solution was evaluated as follows: ACT CRS panels were processed as outlined and examined for visual oxidation (red-rust). For comparison, DI water was evaluated as a control.

Process:
Clean: Bondente® C-AK T51; 49° C.; 90 second spray; Free Alkalinity=5.5 pts.; pH=11.7
Rinse: City Water; 43° C.; 60 second spray
Rinse: Test solutions
  1. DI Water; Temperature varies; pH=6.9; 2 minute immersion
  2. Dopamine/PEI Reaction Product E (200 ppm); Temperature varies; pH=9.5; 2 minute immersion
Air dry: forced air, 90 psi
Results:

| Candidate | Pre-rinse Temperature | | |
|---|---|---|---|
| | 23° C. | 27° C. | 32° C. |
| DI water | Flash-rust ~20% | Flash-rust ~50% | Flash-rust >50% |
| Dopamine/PEI Reaction Product E (200 ppm) | No rust | No rust | No rust |

Note:
the solution of Dopamine/PEI Reaction Product E contains <1 ppm chloride ion.

Example 10

In this example, a dopamine solution was evaluated as a pre-rinse for comparison to the solution of preformed dopamine/PEI reaction product.

A 200 ppm solution of dopamine was prepared using DI water, dopamine hydrochloride, and ammonium bicarbonate to adjust the pH to 8.5.

The solution was evaluated as follows: ACT CRS panels were processed as outlined and examined for visual oxidation (red-rust). For comparison, DI water was evaluated as a control.

Process:
Clean: Bonderite® C-AK T51; 49° C.; 90 second spray; Free Alkalinity=5.5 pts.; pH=11.7
Rinse: City Water; 43° C.; 30 second spray
Rinse: Test solutions
  1. DI Water; Temperature varies; pH=6.9; 2 minute immersion
  2. Dopamine (200 ppm); Temperature varies; pH=8.5; 2 minute immersion
Air dry: forced air, 90 psi
Results:

| Candidate | Pre-rinse Temperature | | |
|---|---|---|---|
| | 23° C. | 27° C. | 32° C. |
| DI water | Flash-rust ~20% | Flash-rust ~50% | Flash-rust >50% |
| Dopamine (200 ppm) | No rust | No rust | No rust |

The dopamine solution changed with increasing temperature. It was a clear brown solution at 23° C., a dark brown solution at 27° C., and a black solution at 32° C. (the solution was not stable). At 32° C., the dopamine solution formed a black precipitate, which most likely was solid polydopamine.

Example 11

In this example, a polyethyleneimine solution was evaluated as a pre-rinse for comparison to the preformed dopamine/PEI reaction product.

A 200 ppm solution of polyethyleneimine was prepared using DI water and polyethyleneimine at pH=8.5.

ACT CRS panels were processed as outlined and examined for visual oxidation (red-rust). For comparison, DI water was evaluated as a control.

Process:
Clean: Bonderite® C-AK T51; 49° C.; 90 second spray; Free Alkalinity=5.5 pts.; pH=11.7
Rinse: City Water; 43° C.; 30 second spray
Rinse: Test solutions
  1. DI Water; Temperature varies; pH=6.9; 2 minute immersion
  2. Polyethyleneimine (200 ppm); Temperature varies; pH=8.5; 2 minute immersion
Air dry: forced air, 90 psi
Results:

| Candidate | Pre-rinse Temperature | | |
|---|---|---|---|
| | 23° C. | 27° C. | 32° C. |
| DI water | Flash-rust ~20% | Flash-rust ~50% | Flash-rust >50% |
| Polyethyleneimine (200 ppm) | Flash-rust ~20% | Flash-rust ~50% | Flash-rust ~50% |

These tests showed that a polyethyleneimine solution did not prevent flash-rust.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method, comprising a step a) comprising contacting a bare metal substrate surface with an aqueous mixture comprised of at least one water soluble, preformed reaction product of at least one catechol compound and at least one co-reactant compound comprising at least one oligomeric or polymeric amine compound having a number average molecular weight of 500 to 2,000,000 g/mol comprising a plurality of repeating units having structure —[CH2CH2NH]— to provide a pre-rinsed metal substrate surface, and a step b) comprising conversion coating the pre-rinsed metal substrate surface to provide a conversion-coated metal substrate;
wherein the at least one catechol compound includes at least one amino-functionalized catechol compound or salt thereof and the at least one co-reactant compound includes at least one (meth)acryl-functionalized compound wherein a molar ratio of catechol compound(s) to functional groups in the co-reactant compound(s) reactive with the catechol compounds is from 1:0.05 to 1:25.

2. The method of claim 1, wherein the at least one catechol compound is selected from the group consisting of catechol and aminoalkyl-functionalized catechols and salts thereof.

3. The method of claim 1, wherein the at least one catechol compound includes at least dopamine or a salt thereof.

4. The method of claim 1, wherein the at least one oligomeric or polymeric amine compound includes at least one linear or branched polyethyleneimine having a number average molecular weight of 500 to 50,000 g/mol.

5. The method of claim 1, wherein the at least one preformed reaction product includes at least one reaction product which is polymeric.

6. The method of claim 1, wherein the at least one preformed reaction product is obtained by reacting the at least one catechol compound and the at least one co-reactant compound under oxidative conditions.

7. The method of claim 1, wherein the at least one preformed reaction product is obtained by reacting the at least one catechol compound with the at least one co-reactant compound in an aqueous reactant mixture at a temperature of from 10 to 100° C. for a time of from 1 to 20 hours in the presence of molecular oxygen.

8. The method of claim 1, wherein the at least one preformed reaction product is present in the aqueous mixture at a concentration of from 5 to 500 ppm.

9. The method of claim 1, wherein contacting the bare metal substrate surface with the aqueous mixture is carried out for a time of from 10 seconds to 20 minutes at a temperature of 10 to 54° C.

10. The method of claim 1, wherein the aqueous mixture, when contacted with the bare metal substrate surface, has a pH of from 4 to 11.

11. The method of claim 1, wherein a passivating barrier layer comprised of the at least one preformed reaction product is formed on the bare metal substrate surface during step a).

12. The method of claim 1, wherein the bare metal substrate surface is obtained by cleaning a contaminated surface of a metal substrate with an alkaline cleaner.

13. The method of claim 1, wherein step b) comprises contacting the pre-rinsed metal substrate surface with an acidic aqueous conversion coating composition comprised of at least one Group IV metal.

14. The method of claim 1, wherein the bare metal substrate surface is comprised of iron.

15. The method of claim 1, wherein the at least one preformed reaction product comprises at least one catechol compound and at least one co-reactant compound comprising at least one oligomeric or polymeric amine compound consisting of a plurality of repeating units having structure —[CH$_2$CH$_2$NH]—.

16. The method of claim 1, further comprising prior to step a):
cleaning the bare metal surface;
water rinsing the bare metal surface;
and optionally adjusting pH of the aqueous mixture;
wherein the molar ratio of catechol compound(s) to functional groups in the co-reactant compound(s) reactive with the catechol compounds is from 1:0.05 to 1:10;
and step a) contacting the bare metal surface with the aqueous mixture is for a time of about 5 seconds to 20 minutes thereby providing a pre-rinsed metal substrate surface exhibiting less flash rust once exposed to air after step a) and prior to step b), compared to DI water immersion for an identical time.

17. The method of claim 16, wherein the at least one preformed reaction product comprises a Michael addition reaction product of said at least one co-reactant compound comprising a nucleophilic functional group reactive with an electrophilic site on the at least one catechol compound.

18. The method of claim 17, wherein the nucleophilic functional group is selected from a primary amino, secondary amino, thiol or hydroxyl group, reactive with the electrophilic site on the at least one catechol compound.

19. The method of claim 17, wherein the at least one catechol compound comprises dopamine; the co-reactant compound is polyethyleneimine comprising primary amino nucleophilic functional groups reactive with electrophilic aromatic ring carbons of the dopamine.

20. The method of claim 16, wherein the at least one preformed reaction product comprises a Michael addition reaction product of the catechol according to formula (I)

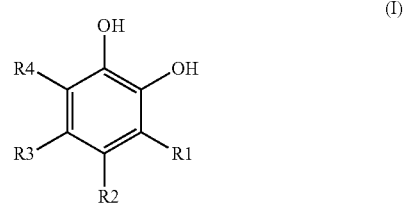

where R3 is C1-C12 alkyl and comprises a primary amine functional group; and R2 is H or a halo substituent;
and said at least one co-reactant compound comprising the nucleophilic functional group reactive with the electrophilic site on the catechol according to formula (I) comprising the aromatic ring carbon to which R2 is bound.

21. The method of claim 16, wherein the water rinse stages apply no sodium nitrite.

22. The method of claim 21, wherein step a) contacting the bare metal substrate surface with the aqueous mixture is carried out for a time of from 5 seconds to 6 minutes at a temperature of 32 to 43° C.

23. The method of claim 22, wherein step b) the conversion coating is a phosphate-free Group IV metal oxide depositing conversion coating.

24. The method of claim 23, wherein step b is followed by electrophoretic coating of the conversion-coated metal substrate surface.

25. The method according to claim 1 further comprising steps of cleaning and water rinsing the bare metal surface and adjusting pH of the aqueous mixture prior to step a); wherein the contacting step a) is for a time of about 5 seconds to 20 minutes thereby providing the pre-rinsed metal substrate surface with inhibited flash-rusting prior to the step b) conversion coating.

* * * * *